May 1, 1951  B. SHARP  2,550,871
CHUCK
Filed Nov. 5, 1948
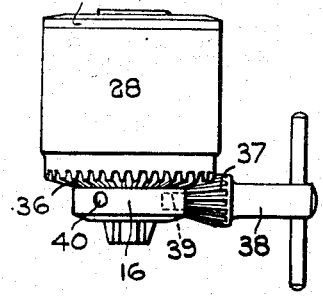
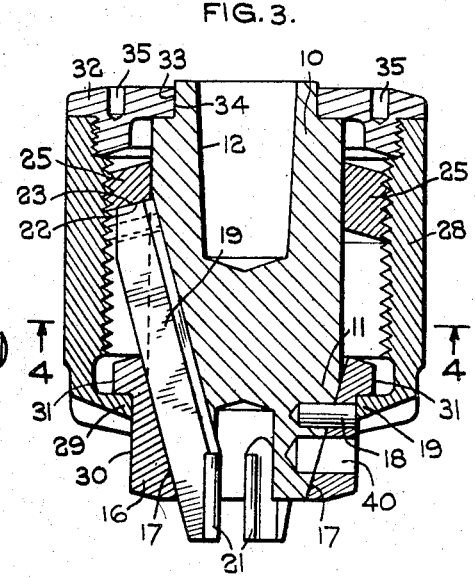
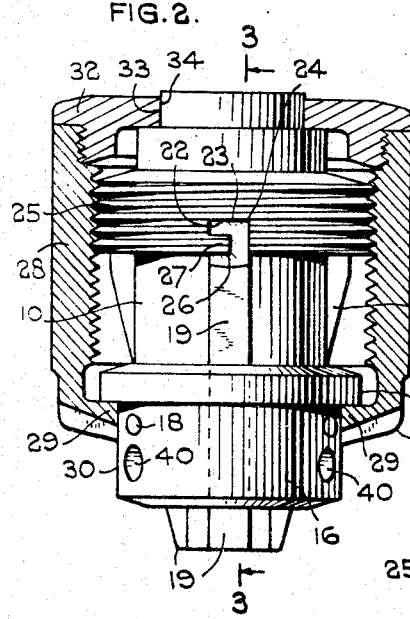
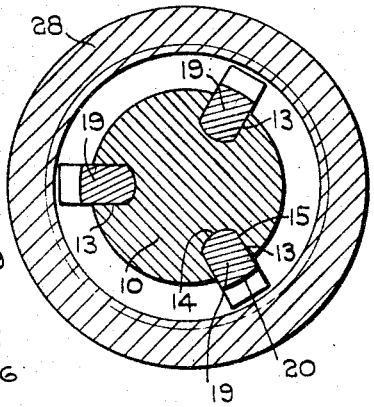
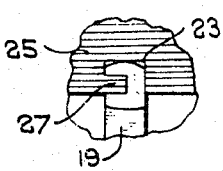
Inventor
Bertie Sharp
By Lucke & Lucke
Attorney

UNITED STATES PATENT OFFICE 2,550,871

CHUCK

Bertie Sharp, Birmingham, England, assignor to Brooke Tool Manufacturing Company, Limited, Birmingham, England, a British company Application November 5, 1948, Serial No. 58,499
In Great Britain July 29, 1948

6 Claims. (Cl. 279—60)

This invention relates to chucks for use with drilling machines and other machine tools including portable drills both power and hand operated and all hereinafter referred to by and included in the term machine. The invention is concerned with such chucks which are of the kind comprising a body having a plurality of symmetrically disposed openings therein in each of which is mounted a jaw, the jaws being each arranged on the surface of a cone and being slidable along said openings towards or away from the apex of the cone so as to be engaged with or disengaged from the drill or other tool, means being provided for simultaneously sliding each of said jaws into gripping engagement with or out of engagement from the tool.

The invention has for its object the provision of an improved form of chuck of the above kind which is particularly inexpensive to manufacture and which possesses relatively few separate parts and which at the same time is of especially robust construction, which will retain its accuracy after a relatively long period of use, and in which the jaws can be removed from the chuck and replaced without interfering with the accuracy of the chuck.

Referring to the drawings:

Figure 1 is a side elevation of one form of chuck constructed in accordance with the present invention and intended for use on either a power driven or a hand operated portable drill.

Figure 2 is a cross sectional view of the chuck depicted in Figure 1.

Figures 3 and 4 are sectional views on the lines 3—3 of Figure 2 and 4—4 of Figure 3 respectively.

Figure 5 is a detailed view showing a slight modification.

Referring firstly to Figures 1 to 4 of the drawings the chuck there illustrated comprises a body 10 of cylindrical configuration over the greater part of its length but formed at one end thereof with a tapering frusto conical part 11, the opposite end of the body being formed with a tapered hole 12 whereby the body can be mounted non-rotatably and directly upon the end of the chuck driving spindle of the drill.

The body including the frusto conical part 11 thereof is formed externally over the greater portion of its length with a plurality, conveniently three, symmetrically disposed slots 13, the bases 14 of which are each tangential to the surface of a cone concentric to but lying within the frusto conical portion 11 of the body 10 so that such cone has its apex near the frusto conical end of the body.

These slots are formed by an ordinary milling operation so that the sides 15 of the slots are straight and flat with the two sides of each slot preferably parallel with one another as shown.

Mounted on the frusto conical portion 11 of the body is a collar 16, the internal surface 17 of which is coned to correspond to the coned exterior of the frusto conical portion 11 and the collar is secured rigidly to the body in fixed relation thereto by a plurality of dowel pins, preferably three in number extending radially through a hole in the collar and body, one of the pins being indicated at 18 in Figure 3.

The coned internal surface 17 of the collar 16 co-operates with the two sides and base of each of the slots 13 in providing a guide of predetermined cross section in which each of the jaws 19 are slidably mounted.

This collar together with the frusto conical portion 11 of the body and the slots 13 are formed to the desired predetermined accuracy during the manufacture of the chuck and the collar is fitted accurately in fixed position on the body during the assembly of the chuck by the manufacturer and is not intended subsequently to be removed from the body at the instance of the user, so that once the collar is assembled in position the predetermined initial accuracy of guiding of each jaw may be maintained.

Each of the jaws 19 are of such a cross section as to engage slidably with each of the walls of the guide provided by the collar and slots, that is to say, three of the sides of the jaws are of configuration corresponding to the sides and base of each slot so as to engage slidably over the entire surface thereof; the remaining side 20 of the jaw being of curved configuration corresponding to the curvature of the interior of the collar 16 at its outer end so as there to engage slidably with the interior of the collar across the full width of the jaw, the arrangement being such that the jaws are slidable along the length of their respective slots in a direction which is inclined to the longitudinal axis of the body 10.

The jaws are formed with tool engaging faces 21 for engaging and gripping the drill or other tool when the jaws are slidden in a direction towards the end 11 of the body, the jaws moving relatively apart on being slidden in the opposite direction.

The jaws are so shaped that they can be inserted in position within their respective slots and if desired removed therefrom after the collar 16 has been positioned on the body and without disturbing the fixed predetermined position of the collar in relation to the body which thus forms a unit therewith.

Each of the jaws are of similar configuration so as to be interchangeable with one another and the ends of the jaws which are remote from their tool engaging faces are flat as indicated at 22, and these flat ends engage slidably with a correspondingly disposed reaction face 23 formed each by one of three grooves 24 of bayonet slot configuration provided at the positions corresponding to each jaw in one end face of an annular jaw control member 25 which is mounted on the cylindrical exterior of the body so as to be axially displaceable therealong.

Each of the grooves 24 extend outwardly of the body in a direction at right angles to the direction of sliding of the corresponding jaw 19 and the adjacent end of each jaw is formed at one side with a recess 26 to receive slidably the flange 27 of the bayonet slot shaped groove, so that on advancing the jaw control member in either direction axially of the body, the jaws are slidden along their respective slots 13, the inner ends of the jaws sliding relative to the grooves 24 in a direction at right angles to the length of the jaws during such displacement of the jaws by the jaw control member.

The reaction face 23 of each groove 24 serves to transmit the necessary force to the jaws for bringing these into gripping engagement with the tool when the jaw control member is advanced towards the tool, and by disposing the grooves so that each of these faces extend at right angles to the direction of sliding of their respective jaws any resultant force between the jaw control member and the jaws during the tightening of the latter, or during the operation of the chuck tending to tilt or bend the jaws in a direction transverse to their length is avoided.

The same result may be achieved with the arrangement shown in Figure 5 in which the faces 23 are arranged as described and the jaw ends are of part cylindrical configuration so as to have line engagement with such faces along a line at right angles to the direction of sliding of the jaw.

The jaw control member 25 is provided with an external screw thread in threaded engagement with an internally threaded sleeve 28 mounted for rotation around the chuck body by providing the end of the sleeve adjacent to the collar 16 with an inwardly extending flange 29 which engages rotatably with the cylindrical exterior 30 of the collar, the flange 29 further engaging a peripheral flange 31 on the collar so as to locate the sleeve against axial movement in one direction relative to the body.

The sleeve at the end remote from the flange 29 has detachably screwed therein a locking ring 32 having an internal flange 33 which engages rotatably with the exterior of a shouldered part 34 of the body, so that the sleeve is thereby located against axial movement in the opposite direction.

The effect of rotating the sleeve is by reason of its threaded engagement with the jaw control member to advance the member axially and displace each of the jaws simultaneously into or out of engagement with the tool.

The locking ring 32 is intended to be readily detachable from the body and sleeve by providing the ring with a number of holes 35 to receive a suitable key whereby the ring can be removed, whereupon on rotation of the sleeve 28 in one direction the sleeve and jaw control member can readily be disengaged from one another and the jaw control member together with the jaws slidden in a direction away from the coned end 11 of the body so as to withdraw the jaws 19 completely from the body slots for the purpose, if desired, of replacing one or more of the jaws without disturbing the relative predetermined fixed position of the collar 16 and body 10.

Thus the jaws can readily be removed from the body by the user and replaced without the accuracy of guiding of the jaws being impaired and without the necessity to return the chuck to the manufacturer.

The interior surface of the annular jaw control member 25 is of cylindrical configuration so that it extends parallel to the longitudinal axis of the body 10 and is in slidable engagement with the exterior of the body, so that in the event of wear occurring between the locking ring 32 and the part of the body on which it is rotatably mounted as well as of wear occurring between the sleeve flange 29 and the cylindrical exterior 30 of the collar 16 so that the sleeve 28 is free to tilt in relation to the body, tilting of the jaw control member itself in relation to the body cannot occur and the jaws are still simultaneously and equally advanced on displacement of the jaw control member 25 by the sleeve 28.

The sleeve 28 is capable of being turned by hand so as to advance the jaw control member 25, but in addition the end of the sleeve adjacent to the collar 16 is formed with a series of bevel teeth 36 adapted to be engaged by a further set of bevel teeth 37 provided on a hand operated key 38 having a spigoted end 39 adapted to be engaged rotatably with one of a plurality of, preferably three, radial holes 40 provided at symmetrical positions in the collar 16 and the adjacent end of the chuck body 10, so that by turning the key the sleeve 28 can be rotated around the body.

A chuck constructed in accordance with the present invention possesses the advantage that by securing the collar in fixed relation to the chuck body and providing means whereby the jaws can be removed from the body of the chuck without disturbing the relative position of the body and collar in the event of the jaws being removed and replaced, the accurate guiding of the jaws provided by the co-operation of the collar with the slots in the chuck body remains unimpaired and the construction enables a high degree of accuracy in the guiding of the jaws provided by the initial manufacture and assembly of the parts of the chuck to be maintained after a prolonged period of use, even though the jaws are removed from time to time at the instance of the user without the chuck being returned to the manufacturer for repair.

Thus the present invention enables a chuck to be produced in which removal and replacement of the jaws can be performed if desired by a relatively unskilled operator without the accurate guiding provided by the collar in co-operation with the body slots being affected.

By constructing the jaw receiving openings in the body as slots formed in the exterior of the body, the openings can be formed by a milling, slotting or other simple machining operation, which operation is both easier, less expensive and appreciably more accurate in forming the desired openings than is the case in which the openings comprise round holes which are formed by a drilling operation.

Where as is commonly the case with existing constructions of chucks of the above kind the openings comprise holes which are formed by a drilling operation considerable difficulty arises in effecting accurate drilling of the holes by reason of the fact that the walls thereof are not continuous and in particular it is necessary for the three holes to merge into a single hole at the end of the body which is adjacent the tool gripping faces of the jaws. Although the formation of the first hole at such end of the body can readily be effected, as additional holes are drilled, the drill is unsupported laterally at one side of the hole which is being drilled adjacent such end of the body, so that accurate drilling becomes extremely difficult. This difficulty is avoided entirely by the external machining operation which is permitted by the formation of the openings as slots in the exterior of the body.

By making each jaw of similar configuration, manufacturing costs are reduced as compared with known constructions of similar accuracy in which the jaws on each chuck differ from one another in shape, while in the event of failure of any one jaw occurring it is a simple matter to replace such jaw by providing a spare jaw which can be utilized to replace any of the jaws which may fail.

Furthermore, a chuck constructed as above described possesses the further advantage that it involves relatively few parts, is inexpensive and relatively easy to manufacture, while it is of robust construction and is not likely to get out of order after a relatively prolonged period of use.

Furthermore with the construction described the jaws are not weakened by forming them with threads or keyways extending longitudinally of the jaws so that they are of particularly robust construction.

Furthermore, with the construction described the threads of the jaw control member extend continuously around the periphery of the member and are in continuous engagement over their entire circumference with the internal screw threads provided on the outer sleeve so that a particularly robust and wear resisting connection is provided between the outer sleeve and the control member.

Furthermore by mounting the body directly on the spindle or other tool carrier of the machine the body is supported on the tool carrier in a particularly rigid manner involving the use of the minimum number of parts.

Furthermore although the invention has been described as applied to a chuck for use with power drilling machines or hand operated drills its application is not limited thereto, and it may for example be employed with that kind of machine in which the tool including of course the chuck is stationary, the work itself rotating.

By the expression longitudinal axis of the body is meant an axis extending lengthwise of the body symmetrically in relation to the jaws and around which the chuck rotates if mounted on a rotatable driving member, such as the driving spindle in the case of a drilling machine, and the term axial or axis where used herein in relation to the chuck body has reference to such longitudinal axis.

What I claim then is:

1. In a drill chuck of the kind comprising a body having a number of symmetrically disposed openings therein in each of which a jaw is mounted for sliding movement at a common oblique angle to the axis of the chuck while being held against oscillation about its axis of sliding, the formation of the openings as slots in the exterior of the body, a collar formed separately from the body and extending around the slotted exterior of the body at one end of the chuck, means securing said collar rigidly in fixed relationship to the body, said collar engaging slidably on its inner periphery with each of said jaws, a jaw control member connected to each of the jaws, means for displacing said jaw control member axially in relation to the body and for retaining it in the desired axial position relative to the body, a locking member mounted removably on the end of the chuck remote from the collar adapted to retain the jaw control member, jaws and jaw displacing means upon the chuck body, said locking member being removable from the chuck independently of the means securing the collar to the body, and said jaws on removal of the locking member being themselves removable from the body of the chuck without disturbing the relative position of the body and of the collar thereon.

2. In a drill chuck of the kind comprising a body having a number of symmetrically disposed openings therein in each of which a jaw is mounted for sliding movement at a common oblique angle to the axis of the chuck while being held against oscillation about its axis of sliding, the formation of the openings as slots in the exterior of the body, a collar formed separately from the body and extending around the slotted exterior of the body at one end thereof, means securing said collar rigidly in fixed relationship to the body, said collar engaging slidably on its inner periphery with each of said jaws, a jaw control member connected to each of the jaws, a sleeve mounted detachably on the body for rotation relative thereto about the longitudinal axis of the body, said sleeve being adapted on rotation to displace the jaw control member axially in relation to the body and to retain it in the desired axial position on the body, a locking ring mounted removably on the chuck adapted to retain the sleeve detachably in position on the body, and said jaw control member and jaws being removable from the body on removal of the locking ring and sleeve therefrom without disturbing the relative fixed position of the body and collar thereon.

3. In a drill chuck of the kind comprising a body having a number of symmetrically disposed openings therein in each of which a jaw is mounted for sliding movement at a common oblique angle to the axis of the chuck while being held against oscillation about its axis of sliding, the formation of the openings as slots in the exterior of the body, a collar formed separately from the body and extending around the slotted exterior of the body at one end thereof, means securing said collar rigidly in fixed relationship to the body, said collar engaging slidably on its inner periphery with each of said jaws, a jaw control member connected to each of the jaws, a sleeve mounted detachably on the body for rotation relative thereto about the longitudinal axis of the body, said sleeve being adapted on rotation to displace the jaw control member axially in relation to the body and to retain it in the desired axial position on the body, said body having a shouldered part on its exterior at the end thereof remote from the collar, a locking ring mounted removably on the sleeve engaging rotatably with said shouldered part so as to retain the sleeve detachably in position on the body; and said jaw control member and jaws being removable from the body on removal of the locking ring and sleeve therefrom without disturbing the relative fixed position of the body and collar thereon.

4. In a drill chuck of the kind comprising a body having a number of symmetrically disposed openings therein in each of which a jaw is mounted for sliding movement at a common oblique angle to the axis of the chuck while being held against oscillation about its axis of sliding, the formation of the openings as slots in the exterior of the body, a collar formed separately from the body and extending around the slotted exterior of the body at one end thereof, a collar securing member formed separately from said body and collar mounted permanently on said body and engaging said collar to locate it against movement relative to said body, said collar engaging slidably on its inner periphery with each of said jaws, a jaw control member connected to each of the jaws and means for displacing said jaw control member axially in relation to the body and for retaining it in the desired axial position relative to the body, and means whereby the jaws can be removed from the body of the chuck if desired and without disturbing the relative position of the body and of the collar thereon.

5. In a drill chuck of the kind comprising a body having a number of symmetrically disposed openings therein in each of which a jaw is mounted for sliding movement at a common oblique angle to the axis of the chuck while being held against oscillation about its axis of sliding, the formation of the openings as slots in the exterior of the body, said body being of cylindrical form coned externally at one end, said slots extending through said coned part of said body, a collar formed separately from said body extending around said coned part in engagement with the periphery thereof, means securing said collar rigidly in fixed relationship to the body, said collar engaging slidably on its inner periphery with each of said jaws, an annular jaw control member mounted removably on the cylindrical part of said body and displaceable axially thereof, said jaw control member being connected to each of said jaws, said jaws being removable from said slots in a direction away from said collar, a sleeve extending around said annular jaw control member and body, said sleeve being rotatable relative to said body about the longitudinal axis thereof, screw thread means connecting said sleeve detachably to said jaw control member, means retaining said sleeve against axial movement relative to said body and said sleeve retaining means being adapted to permit of said sleeve being removed from said body.

6. In a drill chuck of the kind comprising a body having a number of symmetrically disposed openings therein in each of which a jaw is mounted for sliding movement at a common oblique angle to the axis of the chuck while being held against oscillation about its axis of sliding, the formation of the openings as slots in the exterior of the body, said body being of cylindrical form coned externally at one end, said slots extending through said coned part of said body, a collar formed separately from said body extending around said coned part in engagement with the periphery thereof, a collar securing member formed separately from said body and collar mounted permanently on said body and engaging said collar to locate it against movement relative to said body, said collar engaging slidably on its inner periphery with each of said jaws, an annular jaw control member mounted removably on the cylindrical part of said body and displaceable axially thereof, said jaw control member being connected to each of said jaws, said jaws being removable from said slots in a direction away from said collar, a sleeve extending around said annular jaw control member and body, said sleeve being rotatable relative to said body about the longitudinal axis thereof, screw thread means connecting said sleeve detachably to said jaw control member, a peripheral flange on the exterior of said collar, an inwardly directed flange on one end of said sleeve engaging notatably the outer side face of said collar flange, said body having a shouldered part on its exterior at the end thereof remote from the collar, and a locking ring mounted detachably on the other end of said sleeve and engaging rotatably with said shouldered part of said body.

BERTIE SHARP.

REFERENCES CITED

The following references are of record in the file of this patent:

UNITED STATES PATENTS

| Number | Name | Date |
|---|---|---|
| 879,741 | Coit | Feb. 18, 1908 |
| 1,321,969 | Aris | Nov. 18, 1919 |

FOREIGN PATENTS

| Number | Country | Date |
|---|---|---|
| 406,209 | Great Britain | Feb. 22, 1934 |